(12) United States Patent
Stewart

(10) Patent No.: US 7,940,073 B1
(45) Date of Patent: May 10, 2011

(54) DEACTIVATION OF INTEGRATED CIRCUITS

(75) Inventor: Roger G. Stewart, Hillsborough, NJ (US)

(73) Assignee: Kovio, Inc., Milpitas, CA (US)

( * ) Notice: Subject to any disclaimer, the term of this patent is extended or adjusted under 35 U.S.C. 154(b) by 0 days.

(21) Appl. No.: 12/329,302

(22) Filed: Dec. 5, 2008

(51) Int. Cl.
*H03K 19/00* (2006.01)

(52) U.S. Cl. .......................................... 326/8; 340/572.1
(58) Field of Classification Search ... 326/8; 340/10.51, 340/572.3, 10.1, 10.2, 572.1; 455/41.1
See application file for complete search history.

(56) References Cited

U.S. PATENT DOCUMENTS

| | | | |
|---|---|---|---|
| 5,874,902 A * | 2/1999 | Heinrich et al. | 340/10.51 |
| 6,412,086 B1 * | 6/2002 | Friedman et al. | 714/733 |
| 7,411,503 B2 * | 8/2008 | Stewart et al. | 340/572.1 |
| 7,446,646 B2 * | 11/2008 | Huomo | 340/10.1 |
| 7,481,178 B2 * | 1/2009 | Laackmann | 116/216 |
| 2005/0276307 A1 * | 12/2005 | Song et al. | 374/120 |
| 2006/0087407 A1 * | 4/2006 | Stewart et al. | 340/10.52 |
| 2006/0125506 A1 * | 6/2006 | Hara et al. | 324/765 |
| 2006/0214794 A1 * | 9/2006 | Wang | 340/572.1 |
| 2007/0018828 A1 | 1/2007 | Stewart et al. | |
| 2007/0141983 A1 * | 6/2007 | Shyu et al. | 455/41.1 |
| 2008/0001725 A1 * | 1/2008 | White et al. | 340/10.51 |
| 2008/0100449 A1 * | 5/2008 | Naccache | 340/572.3 |

OTHER PUBLICATIONS

PCT International Search Report and Written Opinion; PCT International Application No. PCT/US 09/66468; Dated Jan. 29, 2010; 12 pgs.; International Searching Authority/United States, Alexandria, Virginia.

\* cited by examiner

*Primary Examiner* — Rexford N Barnie
*Assistant Examiner* — Crystal L Hammond
(74) *Attorney, Agent, or Firm* — The Law Offices of Andrew D. Fortney; Andrew D. Fortney; Sharon E. Brown Turner

(57) ABSTRACT

Integrated circuits and methods of permanently disabling integrated circuits are disclosed. An integrated circuit having an erasable non-volatile memory adapted to store an activation code and logic to disable the integrated circuit when the code in the erasable non-volatile memory has been altered or erased after it has been separated from a substrate, is placed into an electromagnetic field of sufficient power to erase or reprogram the erasable non-volatile memory. The entire integrated circuit is permanently disabled by erasing, altering, or reprogramming the erasable non-volatile memory. In preferred embodiments, the integrated circuit comprises a non-erasable non-volatile memory storing the activation code, and circuitry adapted to permanently disable the integrated circuit when the code in the erasable non-volatile memory does not match the activation code in the non-erasable non-volatile memory. Erasing, altering, or reprogramming the erasable non-volatile memory results in a mismatch of the non-volatile memories, which permanently deactivates the integrated circuit.

22 Claims, 5 Drawing Sheets

DEACTIVATION OF INTEGRATED CIRCUITS

RELATED APPLICATION(S)

The present application may be related to co-pending U.S. application Ser. No. 12/328,675, filed Dec. 4, 2008, and entitled "Low Cost Testing and Sorting of Integrated Circuits", which is incorporated herein by reference in its entirety.

FIELD OF THE INVENTION

The present invention generally relates to the field of integrated circuits and methods of manufacturing the same. More specifically, embodiments of the present invention pertain to integrated circuits and methods of disabling such integrated circuits.

BACKGROUND

Aspects of the present invention relate to integrated circuits and methods of deactivating the same. The present invention addresses the challenges associated with protecting personal privacy as RFID technology is used to tag individual products that are purchased and taken home by private citizens. For example, RFID systems are becoming widely used in the manufacturing and retail industry. Soon, an RFID tag is expected to be embedded in most retail products that are purchased. Therefore, the public is becoming concerned about the loss of personal privacy that will occur if these tags are used to track a person's location and/or personal habits. Accordingly, as the use of RFID technology becomes more widespread, many people will demand the ability and right to permanently disable or "kill" the RFID tags embedded in the products they purchase.

Neither unpackaging every product nor pulling the tag off of every item purchased provides a practical solution, especially when one who wishes to avoid having the item detected could do the same thing before the item gets to the checkout counter or other scanner. Therefore, a need is felt for a way to electronically and remotely kill the tags (e.g., if requested by the customer) after tracking the item is no longer desired (e.g., immediately after the customer has paid for the tagged products). While high-power techniques for permanently disabling electronic devices (such as blowing fuses, anti-fuses, etc.) are known, such techniques require that the device be placed into an electromagnetic field of sufficient power to disable the tag. As a result, these techniques are impractical in most RFID applications. For example, total reader transmission power is limited to 1 Watt by FCC regulations, and the RFID devices must be programmable at a distance of 10 meters or more from the reader. Practical RFID systems require that the KILL command must be executed with a tag power consumption of only about 1 microwatt. This power is considerably less than that necessary to blow a fuse, antifuse, or most other such programmable non-volatile memory devices. This is why most modern RFID tags must use EPROM or EEPROM memory technology for all wireless READ and WRITE operations.

However the current use of EPROM or EEPROM memory has also created a possible privacy problem because EPROM and EEPROM memories can be easily reset to their initial or "virgin" state using ultraviolet light, X-ray radiation, an electrical signal, or other methods known in the art. Because all current RFID tags are fully functional in the initial or "virgin" state, any of these "killed" or disabled integrated circuits/tags can be easily and remotely "resurrected." Once an integrated circuit has been re-enabled in this manner, it can be easily, remotely and surreptitiously re-programmed, and used to track people without permission or knowledge. This may constitute an unacceptable invasion of privacy. Once this possibility becomes widely known, such "resurrectable" tags may be unacceptable to the general public. Thus, the industry will benefit from a way to permanently disable or "kill" these integrated circuits (e.g., RFID tags/devices) so that they cannot ever be reactivated by someone else.

SUMMARY OF THE INVENTION

The integrated circuits and methods of disabling integrated circuits of the present invention, address the above-described problems, and thus protect against invasion of privacy by deliberately designing the integrated circuits so that they will not work independently in an initial or "virgin" state. After an integrated circuit has been programmed, and subsequently disabled as described herein, it is not possible to restore the integrated circuit to an independently functional state using methods known in the art.

According to the present invention, an integrated circuit may be permanently disabled by placing the integrated circuit into an electromagnetic field of sufficient power to erase or reprogram the programmable non-volatile memory, and then disabling the integrated circuit by erasing or altering the erasable non-volatile memory. The logic of the integrated circuit is configured to disable the entire integrated circuit when the activation code in the erasable non-volatile memory has been altered or erased after the integrated circuit is separated from a silicon substrate or wafer. Altering, erasing, and/or reprogramming the erasable non-volatile memory results in total disablement of the integrated circuit. In the present invention, total disablement of an integrated circuit generally comprises totally disabling the function(s) of the integrated circuit. This may be accomplished by disabling power to the integrated circuit (e.g., destroying the rectifier), disabling the read and/or program functions of the integrated circuit, stopping the clock function so that all operations are disconnected/discontinued, and/or any other method known in the art.

Integrated circuits suitable for use with embodiments of the present invention comprise a non-erasable non-volatile memory storing an activation code, and an erasable non-volatile memory adapted to store a duplicate copy of the activation code. The integrated circuit further comprises circuitry (e.g., logic) adapted to erase or modify the erasable non-volatile memory when the integrated circuit is placed into an electromagnetic field of sufficient power to erase, modify, or reprogram the erasable non-volatile memory. The integrated circuit also includes circuitry adapted to permanently disable one or more operating functions of the integrated circuit when the code in the erasable non-volatile memory does not directly or logically match the activation code stored in the non-erasable non-volatile memory.

In some embodiments, the integrated circuits may be initially arranged and tested in a cluster on a substrate. In such embodiments, each cluster has test pads or "cluster" pads connected to common power and data busses, which provide common power supply and data signals to each integrated circuit in the cluster. In an initial (e.g., "virgin") state, the non-erasable and the erasable non-volatile memory are different from (do not match) one another. Each integrated circuit will function independently if the non-erasable memory and the erasable non-volatile memory match. Thus, an integrated circuit is not independently functional in its initial state. However, the circuits are functional in the non-matching, virgin state when they are connected to one another in the cluster.

The circuits connected in the cluster are subject to various desired testing processes in parallel. For integrated circuits that pass testing, the activation code is written into the erasable non-volatile memory. For integrated circuits that fail to receive the test signal(s), or circuits that fail one or more tests in the testing process, the activation code is not written into the erasable non-volatile memory. Upon separation from the cluster, the common power and data busses are severed, and the integrated circuits can be queried to determine which integrated circuits are independently functional and which are not.

After the testing process, independently functional integrated circuits can be affixed to, or embedded in items for distribution (e.g., RFID tags). To disable the integrated circuit (e.g., upon valid sale of the item, and/or upon consumer request), the integrated circuit is placed into an electromagnetic field of sufficient power to erase or reprogram the erasable non-volatile memory. Logic in the integrated circuit is adapted to entirely disable the integrated circuit when the code in the erasable non-volatile memory has been altered or erased after the integrated circuit is separated from a silicon substrate. Thus, placing the integrated circuit into the electromagnetic field erases or alters the erasable non-volatile memory, and the logic disables the integrated circuit.

One method for determining if the erasable non-volatile memory has been altered or erased is to equip each integrated circuit with logic adapted to detect or determine whether the code in the erasable non-volatile memory matches the activation code stored in the non-erasable memory. If the logic determines that the codes do not match, then the logic also determines that the erasable non-volatile memory has been erased or altered. The logic may also be adapted to permanently disable the integrated circuit, so that any circuit with the non-matching codes will be non-functional when separated from the cluster.

By designing the integrated circuits so that they will not function independently in an initial or virgin state, the integrated circuit can be rendered permanently inoperable, such that it cannot be revived using UV light, X-ray radiation, an electrical signal, or other method known in the art.

These and other advantages of the present invention will become readily apparent from the detailed description of preferred embodiments below

DETAILED DESCRIPTION OF THE PREFERRED EMBODIMENTS

Figure 1:
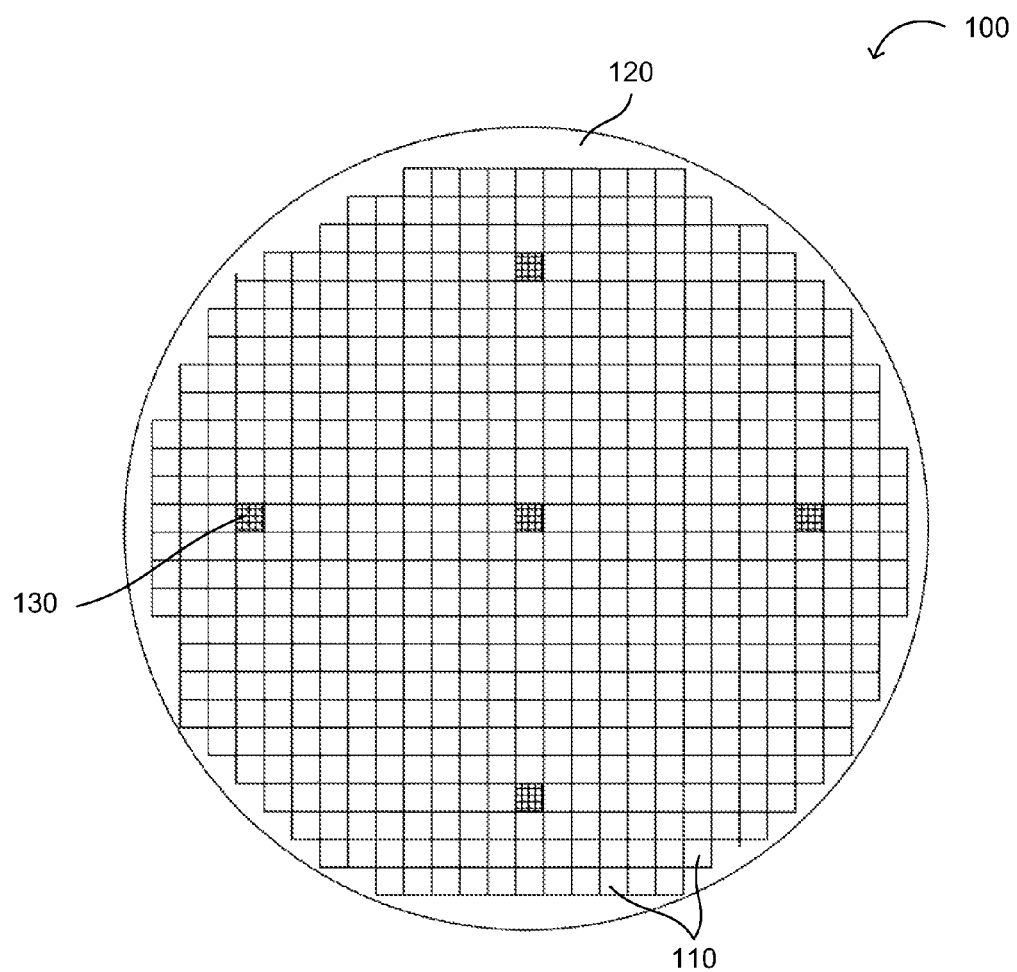
FIG. 1 is a top-down diagram showing approximately 600 integrated circuit clusters on a wafer/substrate according to embodiments of the present invention.

Reference will now be made in detail to the preferred embodiments of the invention. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

For the sake of convenience and simplicity, the terms "integrated circuit," "tag," "chip," "die," "RF," "RFID," and "identification" may be used interchangeably with respect to intended uses and/or functions of a device and/or tag, and the term "tag" or "device" may be used herein to refer to any RF, RFID, and/or identification sensor, tag and/or device. Also, the terms "integrated circuit" and "integrated circuitry" refer to a unitary structure comprising a plurality of electrically active devices formed from a plurality of conductor, semiconductor and insulator thin films, but generally does not include discrete, mechanically attached components (such as die, wire bonds and leads, or an antenna and/or inductor component), or materials having primarily an adhesive function. In addition, the terms "item," "object" and "article" are used interchangeably, and wherever one such term is used, it also encompasses the other terms.

Some portions of the detailed descriptions which follow may be presented in terms of processes, procedures, logic blocks, functional blocks, processing, and other symbolic representations of operations on code, data bits, data streams or waveforms within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "operating," "computing," "calculating," "determining," or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "wiring," "line," "signal," "conductor" and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "data," "data stream," "waveform" and "information" may be used interchangeably, as may the terms "connected to," "coupled with," "coupled to," and "in communication with" (which may refer to direct or indirect connections, couplings, or communications), but these terms are generally given their art-recognized meanings herein.

Similarly, for convenience and simplicity, the terms "clock," "time," "timing," "rate," "period" and "frequency" are, in general, interchangeable and may be used interchangeably herein, but are generally given their art-recognized meanings Further, a "tag" may refer to a single device or to a sheet, reel, and/or a spool comprising a plurality of attached structures, suitable for electronic article surveillance (EAS), high frequency (HF), ultrahigh frequency (UHF), radio frequency (RF) and/or RF identification (RFID) purposes and/or applications.

Aspects of the present invention concern integrated circuits, and methods of permanently disabling integrated circuits. In the present method, an integrated circuit comprising an erasable non-volatile memory adapted to store an activation code may be permanently disabled by placing the integrated circuit into an electromagnetic field of sufficient power to erase or reprogram the erasable non-volatile memory. The integrated circuit comprises logic (e.g., circuitry) adapted to disable the integrated circuit when a code in the erasable non-volatile memory has been altered or erased after the integrated circuit is separated from a silicon substrate or wafer.

The integrated circuit of the present invention may also comprise a non-erasable non-volatile memory that stores the activation code, and circuitry adapted to erase or modify the erasable non-volatile memory when the integrated circuit is placed into an electromagnetic field of sufficient power to erase or reprogram the erasable non-volatile memory. The erasable non-volatile memory may be adapted to store a duplicate copy of the activation code store in the non-erasable non-volatile memory of the integrated circuit.

In one embodiment of the present invention, the integrated circuit further comprises circuitry adapted to permanently disable one or more operating functions of the integrated circuit when the code in the erasable non-volatile memory does not match the activation code in the non-erasable non-volatile memory, and the integrated circuit has been separated from a silicon substrate. In such embodiments, the integrated circuits are manufactured and tested in an interconnected cluster on the substrate. In an initial state, the non-erasable non-volatile memory and the erasable non-volatile memory do not match one another. After an integrated circuit passes a self-testing process, the cluster interconnections are used to write the activation code stored in the non-erasable non-volatile memory into the erasable non-volatile memory. If the codes stored in the two memories match, then the integrated circuit is independently functional when separated from the cluster.

When the separated integrated circuit is remotely and wirelessly addressed by a reader at effective distances of up to 200 meters, the erasable non-volatile memory may be altered or erased so that the two memories (at least as read) no longer match. This renders the integrated circuit permanently disabled because the erasable non-volatile memory can only be programmed to match the non-erasable non-volatile memory using the cluster interconnections that were destroyed when the integrated circuit was separated or scribed from the silicon wafer. Therefore, the deliberate design of the integrated circuit is such that it cannot function independently in its initial or virgin state, and therefore it cannot be revived after deactivation using methods known in the art.

The invention, in its various aspects, will be explained in greater detail below with regard to exemplary embodiments.

Exemplary Methods of Permanently Disabling Integrated Circuits

A first aspect of the present invention relates to a method of permanently disabling integrated circuits, such as wireless transponders and/or RFID devices. The integrated circuit has an erasable non-volatile memory adapted to store an activation code, and the integrated circuit is disabled by erasing or altering this memory. Logic in the integrated circuit is adapted to entirely disable the integrated circuit when it determines that the code in the erasable non-volatile memory has been altered or erased after the integrated circuit is separated from a silicon substrate or wafer.

In the various embodiments of the present method, total disablement of the integrated circuit generally comprises totally disabling the function(s) of the integrated circuit. This may be accomplished by disabling power to the integrated circuit by switching off the rectifier or stopping the clock function, so that all operations are disconnected or discontinued.

In the present method, an integrated circuit is disabled by erasing or altering the erasable non-volatile memory in the integrated circuit. In exemplary embodiments, the erasable non-volatile memory is an EPROM or EEPROM, floating gate, MNOS, or other ultra-low-programming-power non-volatile storage device. In alternate implementations, the integrated circuits suitable for use in the present method further comprise a non-erasable, non-volatile information storage device (e.g., memory) that stores the activation code. The erasable and non-erasable non-volatile memories of integrated circuits are discussed in detail below with regard to exemplary integrated circuits. In exemplary embodiments, the integrated circuit further comprises logic adapted to determine whether the erasable non-volatile memory matches the activation code in the non-erasable non-volatile memory. When the logic determines that the codes do not match, either directly or logically, the integrated circuit is permanently disabled.

Figure 2:
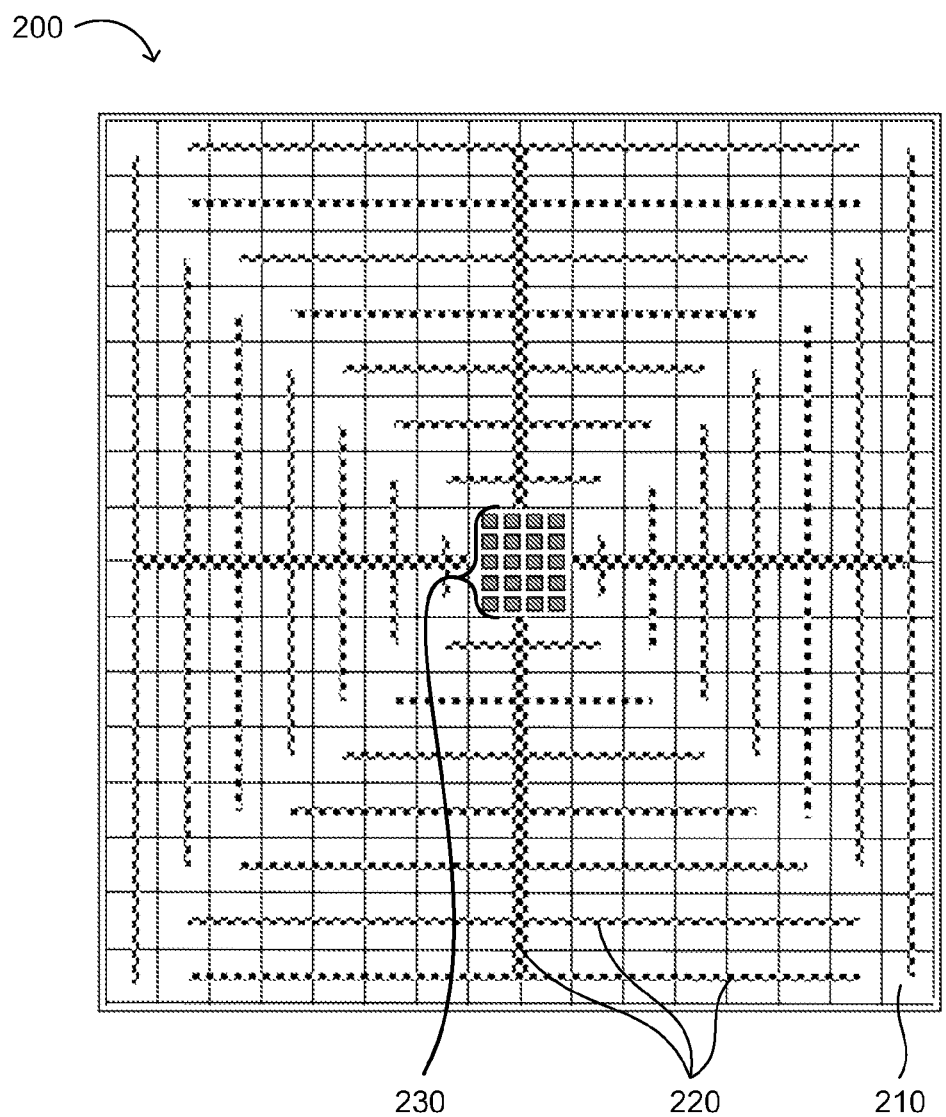
FIG. 2 is a top-down diagram showing integrated circuits (e.g., RFID chips) interconnected in a typical cluster according to embodiments of the present invention.

In the embodiments described above, a plurality of integrated circuits may be arranged and tested in clusters 110 on a substrate/wafer 120 (see, e.g., FIG. 1). Each cluster has external power and data terminals connected to common power and data busses, which provide common power supply and data signals to each integrated circuit in the cluster. FIG. 2 shows a top-down view of a typical 6.9 mm cluster layout 200 according to the present invention. Shown are approximately 252 integrated circuits (e.g., RFID chips) 210, each of which is 420 μm×420 μm. The integrated circuits 210 are connected to an array of cluster test pads 230 by electrical interconnections 220 (e.g., power and signal line busses). The cluster test pad array 230 has replaced four of the integrated circuit locations in the center of the cluster. The test pads allow the test probe to power up and initiate the self-testing process for the plurality of integrated circuits (e.g., the 252 RFID chips) within the cluster.

The power supplies, clock, and self-test trigger signals are distributed outward from the test pads 230 in the center of the cluster to all of the integrated circuits 210 connected within the cluster 200. Preferably, the power and signal line busses 220 are distributed using only the diffusion and polysilicon layers to ensure that they are later severed during the integrated circuit separation process. However, in alternative embodiments, the cluster interconnections may also be provided on a thin-film-transistor (TFT) or silicon-on-insulator (SOI) substrate using other conductive layer or capacitance structures. In an initial (e.g., "virgin") state, the non-erasable non-volatile memory storing the activation code and the erasable non-volatile memory are different from (do not match) one another. In such implementations, each integrated circuit will function independently of the cluster only if the two non-volatile memories match.

The integrated circuits connected in the cluster as described above, are subject to various testing processes including multiple time-consuming PROGRAM/ERASE cycles of the EEPROM or EPROM. For integrated circuits that pass testing, the activation code stored in the non-volatile memory is written into the erasable non-volatile memory, which renders the integrated circuits independently functional. For integrated circuits that fail to receive the test signal (s), or circuits that fail one or more tests in the testing process, the activation code is not written into the erasable non-volatile memory, and the integrated circuits are not independently functional. The integrated circuits in the cluster are subsequently separated, the common power and data busses are severed (e.g., by scribing along scribe lines, etching, or other methods known in the art) and non-functional integrated circuits are discarded. A detailed explanation of the testing and activation process can be found in co-pending U.S. patent application Ser. No. 12/328,675, filed on Dec. 4, 2008, the relevant portions of which are incorporated herein by reference.

Figure 3:
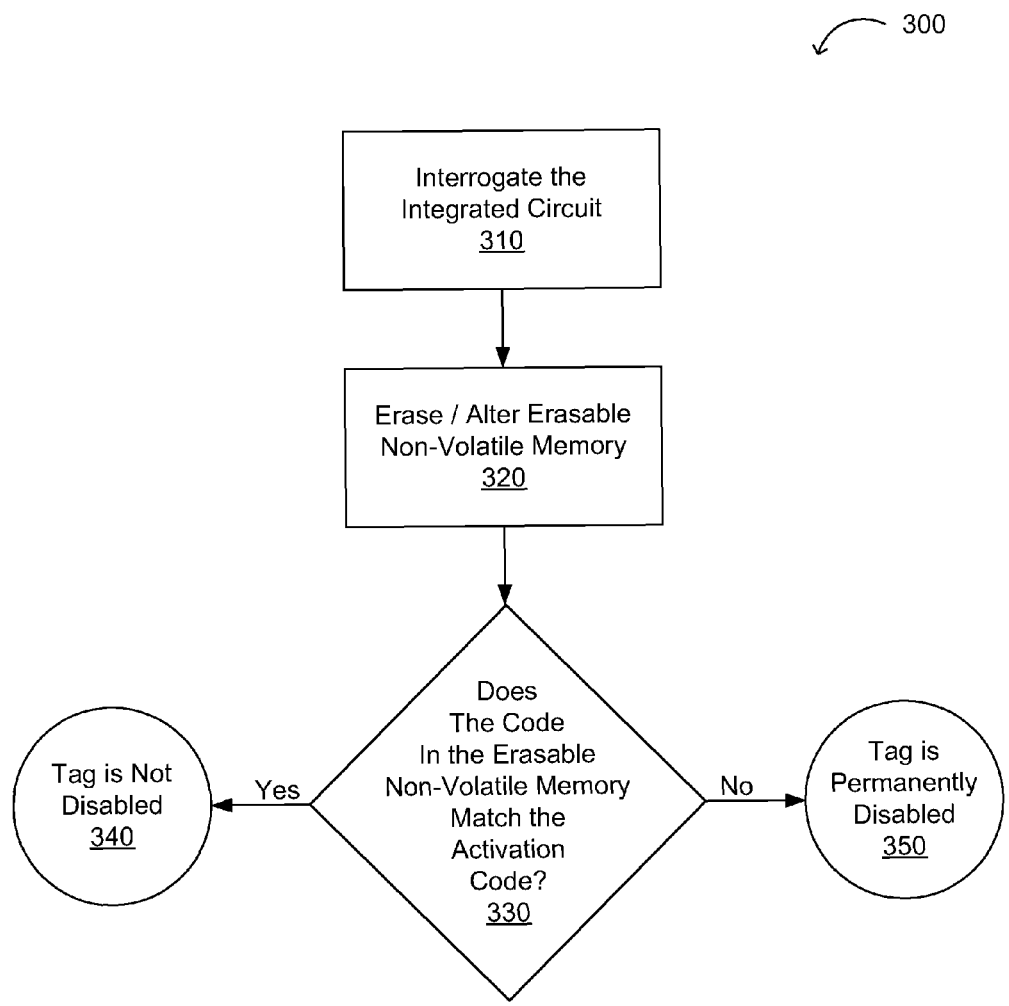
FIG. 3 is an exemplary process flow according to one embodiment of the present invention.

Independently functional integrated circuits can be attached or affixed to a product (e.g., for security and/or tracking purposes). As shown in the exemplary process flow 300 of FIG. 3, and as previously described above, when a user wishes to deactivate the integrated circuit (e.g., after a product is purchased), the integrated circuit is remotely interrogated by a reader at an effective range of 10 to 200 meters to erase or reprogram the erasable non-volatile memory (see steps 310 and 320). This results in a mismatch in the codes stored in the erasable non-volatile memory and the non-erasable non-volatile memory. In exemplary embodiments, each integrated circuit is also equipped with one or more logic circuits and/or one or more analog circuits adapted to detect or determine whether the code in the erasable non-volatile memory matches the activation code stored in the non-erasable non-volatile memory (see decision box 330). If the logic determines that the codes do not match, either directly or logically, the integrated circuit is entirely disabled (see step 350). If the logic determines that the codes match, the integrated circuit is not disabled (see step 340). In such embodiments, the logic may also be adapted to permanently disable the integrated circuit, and render any circuit with the non-matching codes non-functional. Such logic is described in detail below with regard to exemplary integrated circuits.

Of course, one skilled in the art can also easily envision a number of logically equivalent operations on the data in the erasable non-volatile memory so that the same result is achieved (e.g., the codes logically do not match). For example, one can perform a first logic operation on the activation code (e.g., an addition or subtraction operation, inversion of one or more bits, a CRC ("Cyclic Redundancy Checksum"), another type of checksum, or other type of logic operation) prior to writing it into the "erasable" non-volatile memory, then either (i) the reverse operation can be performed as the data are read from the "erasable" non-volatile memory or (ii) the same logic operation can be performed on the activation code prior to determining if the code in the "erasable" non-volatile memory have been erased or altered. This results in the data in the "erasable" non-volatile memory literally not matching the activation code, but the data read from the two memories can still be used to determine whether or not the contents of the non-volatile memory have been changed since the chip was separated from its cluster. If either (i) the reverse operation on the "erasable" non-volatile memory or (ii) some other logic operation on the activation code controlled by erasable bits of non-volatile memory indicates that the non-volatile memory has been changed since the chip was separated from its cluster, then the chip interprets this as a "logical mis-match" between the codes, and the integrated circuit may be disabled.

In exemplary implementations, an integrated circuit is permanently disabled without consuming more than 1 mW of power. In other implementations, an integrated circuit can be wirelessly disabled at distances of 10 cm, and up to 10 meters, and/or with a transmitter power of no more than 1 watt. According to the present methods, integrated circuits can be remotely and individually singulated and deactivated at rates of over 1,000 tags/second. This permits real-time use of this technique in item level checkout, as required by existing International Privacy Agreements.

In the above-described embodiments, once the erasable non-volatile memory has been erased or reprogrammed (or data therein altered, logically or directly), the integrated circuit is permanently disabled and cannot be revived using techniques known in the art (e.g., x-ray, ultra-violet, etc.). For example, in order for the integrated circuit to be functional, the activation code stored in the non-programmable non-volatile must be written into the erasable non-volatile memory using the common power and data busses in the cluster. Upon separation from the cluster, the common power and data busses are permanently severed. Thus, it is not possible for the activation code stored in the non-programmable non-volatile memory to be re-written into the erasable non-volatile memory. Consequently, once the integrated circuit has been deactivated as described herein, it can never be restored to any functional status, because the only means for re-activating the integrated circuit was destroyed when the integrated circuit was removed from the cluster on which it was built, and the cluster interconnections were permanently dismembered.

Exemplary Integrated Circuits

Another aspect of the present invention relates to integrated circuits. Generally, an integrated circuit of the present invention comprises a non-erasable non-volatile memory that stores an activation code and an erasable (e.g., programmable) non-volatile memory that is adapted to store a duplicate copy of the activation code. The integrated circuit further comprises circuitry (e.g., logic) adapted to erase or modify the erasable non-volatile memory when the integrated circuit is wirelessly commanded by a reader to erase or alter the erasable non-volatile memory. In preferred embodiments, the integrated circuit also comprises circuitry adapted to permanently disable one or more operating functions of the integrated circuit when the code in the erasable non-volatile memory does not match the activation code, directly or logically. Preferably, the integrated circuit is an RFID device (tag), or a wireless transponder.

In some embodiments, the integrated circuit further comprises circuitry adapted to program the erasable non-volatile memory the activation code that is stored in the non-erasable non-volatile memory. In such embodiments, the integrated circuit is functional only when the activation code in the non-erasable non-volatile memory matches the code in the erasable non-volatile memory and is non-functional when the activation code does not match the code in the erasable non-volatile memory.

In some embodiments, the non-erasable non-volatile memory comprises a ROM memory and the activation code may comprise a unique ROM code. Although a 16-bit ROM code is described in the embodiment shown in FIG. 5, different lengths of ROM code could be used instead of 16. This includes using only a single bit (or logic connection) for the ROM code, as long as that one bit (or logic connection) is different from the un-programmed bit (or state) initially present in the erasable/programmable non-volatile memory. For example, first and second single-bit non-volatile memory codes could be compared by applying the erasable non-volatile memory bit to a logic gate. In this case the presence (or absence) of an inverter at the input of said logic gate constitutes the first ROM code or activation code.

In 16-bit embodiments, each cluster of integrated circuits may have a unique 8-bit ROM coded number that is associated with the cluster, and which is identical for each integrated circuit in the cluster. In such embodiments, the activation code of each integrated circuit in the cluster may comprise the unique 8-bit ROM coded number that is associated with the cluster, along with an 8-bit ROM code that is unique to the individual integrated circuit.

In an exemplary embodiment, the activation code stored in the non-erasable non-volatile memory is different than the code in the erasable non-volatile memory in an initial or virgin state. The activation code, may comprise a unique ROM code, and may comprise $2^m$ bits. Preferably, the activation code that is stored in the non-erasable non-volatile memory comprises at least 16 bits.

As previously discussed, the integrated circuits of the present invention can be manufactured in an interconnected cluster on a substrate/wafer. A substrate may support from 2 to about 1024 clusters. Preferably, there are no fewer than 100 and no more than 1,000 clusters on a single substrate. Referring again to FIG. 1, to illustrate, a top down view of approximately 600 integrated circuit clusters 110 arranged on a 200 mm wafer substrate 120 is shown. The substrate 120 may have a size of, e.g., from 100 mm to 300 mm. In one exemplary embodiment, substrate 120 has a diameter of 200 mm, each cluster is 6.9 mm×6.9 mm, and each cluster contains approximately 252 integrated circuits. While integrate circuit sizes may typically range in size from 100 to 1,000 microns. In this preferred embodiment, the integrated circuits in the cluster are 420 µm×420 µm, and are interconnected to one another. Thus, a typical 200 mm wafer may contain 150,000 or more integrated circuits. In this exemplary embodiment, a cluster size of 6.9 mm×6.9 mm is used to allow the cluster to fit within a single stepper field of a photolithography tool.

Referring still to FIG. 1, the wafer may also support a plurality of wafer acceptance test key blocks 130 arranged among the clusters. While FIG. 1 illustrates an exemplary arrangement of clusters on a round (e.g., silicon) wafer, the invention is not limited as such. In other exemplary methods, the substrate may comprise square or flexible substrate, or any other type of substrate known in the art. In addition, the substrate is not limited to a wafer. On the contrary, the cluster can be formed and tested on any suitable substrate known in the art, including but not limited to glass (e.g., quartz) sheets, wafers, slips, plastic and/or metal foils or slabs, silicon wafers, etc.

When connected in the cluster, each integrated circuit is fully functional. However, when separated from the cluster, the integrated circuit is only functional when the activation code in the non-erasable non-volatile memory matches the erasable non-volatile memory. Upon passing self-testing, the activation code in the non-erasable non-volatile memory can be written into the erasable non-volatile memory so that the codes match. Thus, a passing integrated circuit will be fully and independently functional upon separation (e.g., by scribing along scribe lines, etching, or any other process known in the art) from the cluster (see, e.g., co-pending U.S. patent application Ser. No. 12/328,675, filed on Dec. 4, 2008, the relevant portions of which are incorporated herein by reference).

In some embodiments, the integrated circuit further comprises (1) pad terminals configured to transmit and/or receive external communications and (2) cluster terminals that are temporarily connected to power and data busses. The power and data busses connect the integrated circuit to other neighboring integrated circuits to form a cluster of integrated circuits. In general, the power and data busses are used to test the integrated circuit when probed by an integrated circuit tester. The power and data busses may comprise a semiconductor layer. In some implementations, the power and data busses comprise a diffusion layer or a polysilicon layer in a single crystal silicon substrate. In further implementations, the power and data busses may comprise a metal layer or a capacitor on a thin film transistor substrate.

Figure 4:
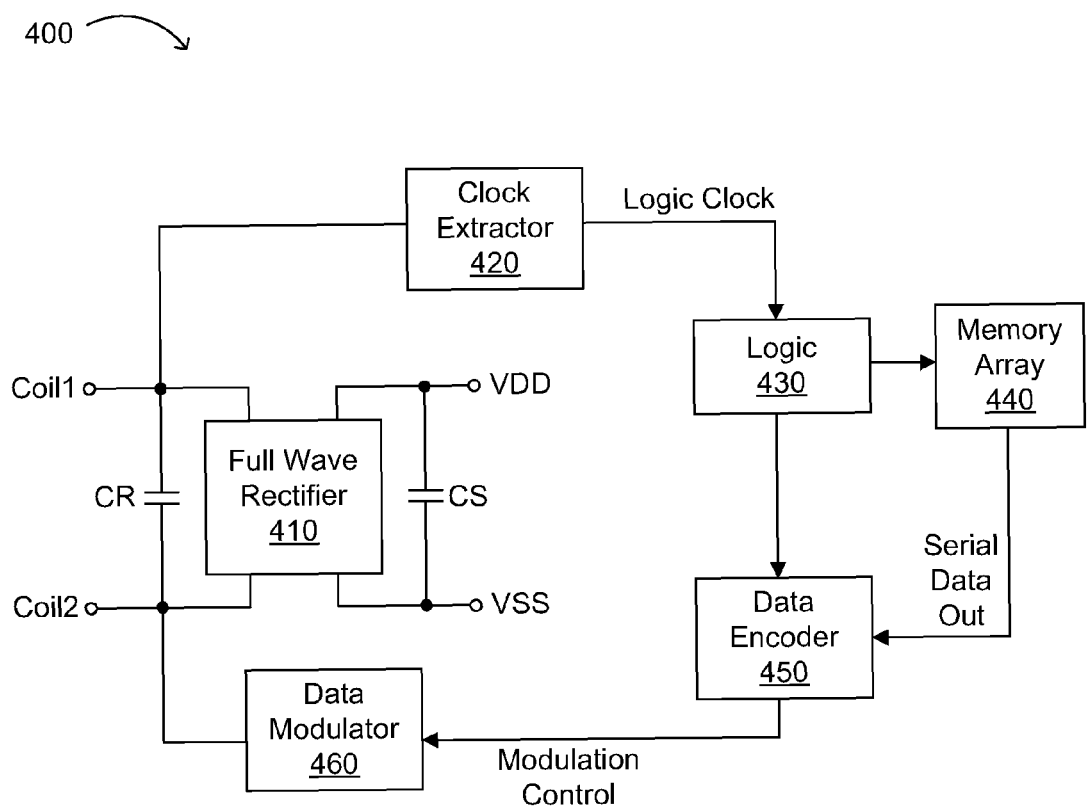
FIG. 4 is an exemplary block schematic diagram showing an integrated circuit (e.g., RFID) design suitable for use in accordance with embodiments of the present invention.

In some embodiments, the integrated circuit further includes self-test circuitry (e.g., built-in self-test circuitry (BIST)). Additionally or alternatively, the integrated circuit may have circuitry adapted to disable some or all of the operational circuitry when the activation code in the non-erasable non-volatile memory does not match the code in the erasable non-volatile memory. For example, FIG. 4 shows an exemplary block schematic diagram of an RFID design including various functional blocks that can be disabled if the activation and erasable non-volatile memory codes do not match. In one exemplary embodiment, the full wave rectifier 410 can be disabled. In another embodiment, the clock extractor 420 can be disabled. In other variations, the data modulator 460, the data encoder 450, the memory array 440 and/or the logic 430 may be disabled. The full wave rectifier 410, the clock extractor 420, the data modulator 460, other functional blocks, and other combinations of functional blocks may be disabled if the activation code stored in the non-erasable non-volatile memory does not match the code in the erasable non-volatile memory.

In preferred embodiments, the circuitry is adapted to permanently disable the integrated circuit without consuming more than 1 mW of power. In other embodiments, the integrated circuit comprises circuitry adapted to wirelessly disable the integrated circuit at a distance of greater than 10 cm (e.g., any distance up to 10 m), and with a transmitter power of 1 W or less.

Additionally or alternatively, the integrated circuit may comprise logic (e.g., a comparator) adapted to detect or determine whether the code in the erasable non-volatile memory matches the activation code (e.g., unique ROM code) stored in the non-erasable non-volatile memory. The logic may also be configured to permanently disable the integrated circuit when the code in the erasable non-volatile memory does not match the activation code, and the integrated circuit has been separated from its cluster.

Figure 5:
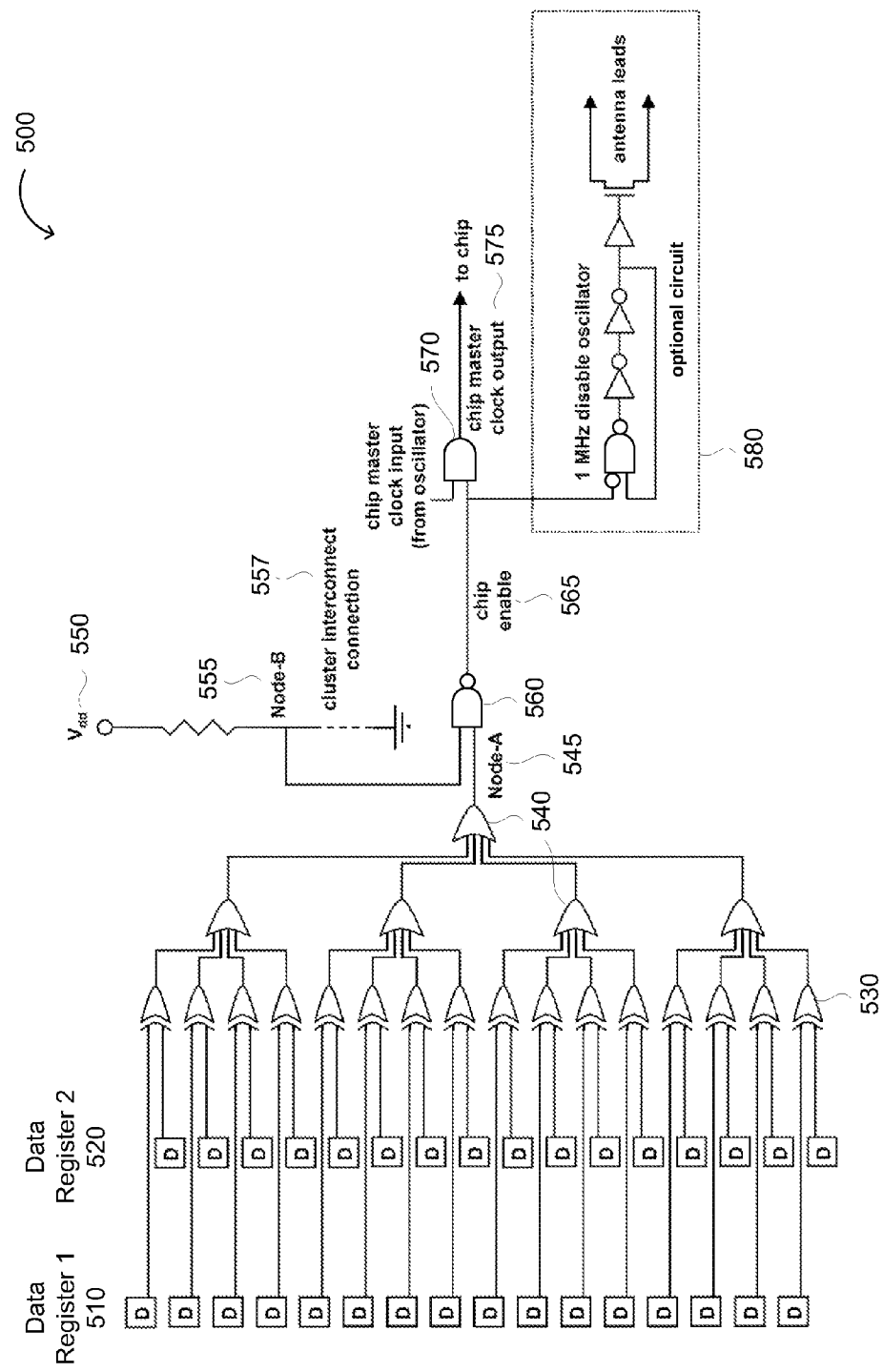
FIG. 5 is a schematic diagram of a logic gate showing logical operations performed in the process of disabling an integrated circuit.

FIG. 5 provides an electrical circuit diagram showing the logic used in the deactivation process described herein. Included in the diagram are two 16-bit data registers 510 and 520. The first data register 510 represents the non-erasable non-volatile memory that stores the activation code (e.g., 16-bit ROM register) and the second data register 520 represents the erasable non-volatile memory (e.g., EEPROM register). The first data register is programmed only during manufacturing and can never be changed. This register stores the activation code for the integrated circuit, and preferably each integrated circuit within a cluster has a unique activation code that is different from any other integrated circuit within that cluster.

Programming the unique activation code during the manufacturing process may be achieved by programming $2^n$ bits of the first data register, to ensure that each integrated circuit within the cluster contains a number that is unique to the cluster (e.g., "the unique cluster number"). In preferred embodiments, the remaining bits of the first data register in each integrated circuit are programmed to ensure that the activation code includes both 3 or more zeroes and 3 or more ones. For example, in one exemplary implementation, 8 of the 16 register bits are programmed with the unique cluster number, and the remaining 8 bits are programmed to ensure that the 16-bit activation code includes at least 5 zeroes and/or 5 ones.

Although it is preferable for each integrated circuit to have a unique activation code relative to the other integrated circuits in the cluster, this is not required. It is only necessary to ensure that the factory-programmed first data register (i.e., non-erasable non-volatile memory storing the activation code) is unlikely to perfectly match the initial (e.g., unprogrammed) code stored in the second data register (i.e., erasable non-volatile memory).

The second data register 520 of FIG. 5 includes a 16-bit activation code space within its memory (e.g., EEPROM) register that is similar to that of the first data register. However, in its initial state, this data register should not match the activation code stored in the first data register 510. Preferably, the initial code in the second data register (e.g., erasable non-volatile memory) will initially comprise all zeroes or all ones. If necessary the erasable non-volatile memory can be UV erased to one of those preferred states.

FIG. 5 further illustrates how the integrated circuit is designed to operate only when the first and second data registers (e.g., non-erasable and erasable non-volatile memories) match. The integrated circuit includes an array of Exclusive-OR (XOR) gates 530, which detect any differences between each corresponding bit stored in the first data register 510 and the second data register 520. If any difference is detected, the XOR gate provides a logic-1 output. The output of each of the XOR gates is received by an OR gate 540 and the output at Node A 545 will go to a logic-1 state if any mismatch is detected between the contents of the 16-bit first data register (i.e., 510) and the second 16-bit data register (i.e., 520).

Initially the $V_{dd}$ (i.e., logic-1 state) 550 is distributed through the cluster interconnect busses 557 to one input of a NAND gate 560. This keeps the integrated circuit enabled regardless of the content of the two 16-bit data registers. The integrated circuit functions are not affected by any mismatch in the two data registers as long as the integrated circuit remains on the wafer, and the cluster interconnections remain intact. As long as the cluster interconnects 557 are preserved, Node-B 555 remains low and the integrated circuit enable control 565 at the output of the subsequent NAND gate 560 remains in the logic-1 state independently of the state of Node-A 545.

Once the cluster interconnects are severed, Node-B 455 goes to the logic-1 state, and the integrated circuit enable 565 becomes responsive to any differences between the first data register 510 and its corresponding portion of the second data register 520. If a mismatch is detected, the integrated circuit enable node 570 is driven to logic-0, which then shuts down the master clock 575. Thus the integrated circuit is permanently disabled. One the other hand, when a mismatch is not detected, the enable node 570 allows the clock input to pass through so that the integrated circuit is provided with a master clock signal, which allows the integrated circuit to function. Consequently, in the preferred embodiment, the integrated circuit has been deliberately designed to become disabled once the integrated circuit has been separated from the silicon wafer on which it was fabricated, and/or the activation code written into the erasable memory has been erased or altered so that it no longer matches the activation code stored in the non-erasable non-volatile memory.

While FIG. 5 shows an exemplary embodiment of the present invention, those of ordinary skill in the art can appreciate that the circuit can be implemented in any number of ways. For example, according to FIG. 5, the circuit comprises 4 input OR gates. However, in various embodiments, the circuit may comprise 2-input or 3-input OR gates. Alternatively or additionally, the circuit may use exclusive NOR gates, AND gates, NAND gates, and/or inverters.

In other embodiments and as previously discussed herein, the integrated circuit may be disabled not only by shutting down its master clock (e.g., clock extractor), but also by blocking certain commands, disabling the full waver rectifier and/or data modulator, or by any other techniques known in the art (e.g., disabling any of the functional blocks described herein, etc.).

CONCLUSION/SUMMARY

Thus, the present invention provides integrated circuits and methods of permanently disabling integrated circuits. The present invention addresses the problem associated with the invasion of consumer privacy that occurs when a deactivated security device affixed to an item that the consumer purchased, is remotely and surreptitiously reactivated and re-written so that it can be used to track the consumer. The present invention provides a solution to this problem by disclosing methods for permanently disabling integrated circuits (e.g., RFID tags) by manufacturing the integrated circuit with logic configured to disable the integrated circuit when a code in an erasable non-volatile memory has been altered or erased after the integrated circuit has been separated from a wafer. RFID tags using the present invention may be remotely and individually singulated, and permanently killed, at rates of about 1,000 tags or more/second. This is fast enough to permit real-time use of this technique in item-level checkout in accordance with existing International Privacy Agreements.

Since only about a microwatt of power is required to erase or re-program the EEPROM memory register, tags may be killed wirelessly and remotely at distances of up to 10 meters.

In alternate embodiments, the integrated circuit comprises a non-erasable non-volatile memory storing the activation code, and circuitry adapted to permanently disable the integrated circuit when the code in the erasable non-volatile memory does not directly or logically match the activation code in the non-erasable non-volatile memory. Erasing, altering, or reprogramming the erasable non-volatile memory results in a mismatch of the non-volatile memories, which permanently deactivates the integrated circuit. The present invention provides a method for individuals to quickly and confidently render a security tag permanently inoperable if the individual chooses to do so in order to protect his or her privacy.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of permanently disabling a wireless transponder or a RFID device, comprising:
   a) instructing the wireless transponder or RFID device to erase or reprogram a programmable non-volatile memory, the wireless transponder or RFID device having (i) a non-changeable non-volatile memory storing an activation code, (ii) a changeable non-volatile memory adapted to store a duplicate copy of the activation code, and (iii) logic to disable the entire wireless transponder or RFID device when the code in the changeable non-volatile memory has been changed or erased after an integrated circuit corresponding to the wireless transponder or RFID device is separated from a substrate; and
   b) permanently disabling the wireless transponder or RFID device by erasing or reprogramming the changeable non-volatile memory such that the activation code in the changeable non-volatile memory does not directly or logically match the activation code in the non-changeable non-volatile memory.

2. The method of claim 1, wherein the changeable non-volatile memory is an EEPROM.

3. The method of claim 1, wherein the wireless transponder or RFID device further comprises logic adapted to determine whether the changeable non-volatile memory matches the code in the non-changeable non-volatile memory.

4. The method of claim 1, wherein less than 1 mW of power is consumed to permanently disable the wireless transponder or RFID device.

5. The method of claim 1, wherein the wireless transponder or RFID device is wirelessly disabled.

6. The method of claim 5, wherein the wireless transponder or RFID device is wirelessly disabled at a distance of greater than 10 cm.

7. The method of claim 5, wherein the wireless transponder or RFID device is wirelessly disabled at a distance of greater than 10 cm and with a transmitter power of 1 W or less.

8. The method of claim 1, comprising wirelessly instructing the wireless transponder or RFID device to erase or reprogram the programmable non-volatile memory.

9. The method of claim 1, wherein the substrate comprises a silicon wafer.

10. An A wireless transponder or RFID device, comprising:
   a) a non-changeable non-volatile memory storing an activation code;
   b) a changeable non-volatile memory adapted to store a duplicate copy of the activation code;
   c) circuitry adapted to erase or modify the changeable non-volatile memory when the wireless transponder or RFID device is instructed by a reader to erase or modify the changeable non-volatile memory; and
   d) circuitry adapted to permanently disable one or more operating functions of the wireless transponder or RFID device when, after an integrated circuit corresponding to the wireless transponder or RFID device is separated from a substrate, the code in the changeable non-volatile memory does not directly or logically match the activation code in the non-changeable non-volatile memory.

11. The wireless transponder or RFID device of claim 10, further comprising circuitry adapted to program the changeable non-volatile memory with the activation code.

12. The wireless transponder or RFID device of claim 10, wherein the integrated circuit is (i) functional when the activation code in the non-changeable non-volatile memory matches the code in the changeable non-volatile memory and (ii) non-functional when the activation code in the non-changeable non-volatile memory does not directly match the code in the changeable non-volatile memory.

13. The wireless transponder or RFID device of claim 10, further comprising power and data busses, the power and data busses configured to test the integrated circuit when probed by an integrated circuit tester.

14. The wireless transponder or RFID device of claim 13, wherein each of the power and data busses comprise a diffusion layer or a polysilicon layer in a single crystal silicon substrate.

15. The wireless transponder or RFID device of claim 10, wherein the changeable non-volatile memory comprises an EEPROM.

16. The wireless transponder or RFID device of claim 10, further comprising a comparator configured to determine whether the code stored in the changeable non-volatile memory matches the activation code in the non-changeable non-volatile memory.

17. The wireless transponder or RFID device of claim 10, wherein the integrated circuit comprises one or more RFID function blocks.

18. The wireless transponder or RFID device of claim 17, further comprising circuitry adapted to permanently disable one or more of the one or more RFID function blocks when the changeable non-volatile memory does not directly match the activation code in the non-changeable non-volatile memory.

19. The wireless transponder or RFID device of claim 10, wherein the substrate includes a cluster of integrated circuits formed thereon, the cluster further comprising common power and data busses configured to test the integrated circuits when probed by an integrated circuit tester.

20. The cluster of claim 19, wherein the substrate comprises a single crystal silicon wafer, and each of the power and data busses comprise a diffusion layer in or a polysilicon layer on the single crystal silicon wafer.

21. A cluster of integrated circuits on a substrate, each integrated circuit corresponding to a wireless transponder or a RFID device, and the cluster comprising scribe lines for separating the integrated circuits from the substrate, each integrated circuit in the cluster comprising:
- a) a non-programmable non-volatile memory adapted to store an activation code;
- b) a programmable non-volatile memory adapted to store a duplicate copy of the activation code; and
- c) logic to permanently disable the integrated circuit when the contents of the programmable non-volatile memory are altered or erased after separation from the substrate and when the contents of the programmable non-volatile memory do not directly or logically match the contents of the non-programmable non-volatile memory.

22. The cluster of claim 21, wherein the cluster further comprises common power and data busses configured to test the integrated circuits when probed by an integrated circuit tester.

* * * * *